United States Patent [19]
Hirayama

[11] Patent Number: 6,009,194
[45] Date of Patent: Dec. 28, 1999

[54] METHODS, SYSTEMS AND COMPUTER PROGRAM PRODUCTS FOR ANALYZING INFORMATION IN FORMS USING CELL ADJACENCY RELATIONSHIPS

[75] Inventor: Yuki Hirayama, Kanagawa-ken, Japan

[73] Assignee: International Business Machines Corporation, Armonk, N.Y.

[21] Appl. No.: 08/888,555

[22] Filed: Jul. 7, 1997

[30] Foreign Application Priority Data

Jul. 18, 1996 [JP] Japan ................................ 8-189099

[51] Int. Cl.$^6$ ................................ G06K 9/00; G06K 9/34
[52] U.S. Cl. .................... 382/173; 382/137; 382/164; 382/171
[58] Field of Search .................... 382/137, 171, 382/173, 164

[56] References Cited

U.S. PATENT DOCUMENTS

| | | | |
|---|---|---|---|
| 4,933,979 | 6/1990 | Suzuki et al. | 382/173 |
| 5,416,849 | 5/1995 | Huang | 382/173 |
| 5,555,362 | 9/1996 | Yamashita et al. | 382/173 |
| 5,784,487 | 7/1998 | Cooperman | 382/175 |
| 5,848,184 | 12/1998 | Taylor et al. | 382/173 |
| 5,850,490 | 12/1998 | Johnson | 382/173 |
| 5,852,676 | 12/1998 | Lazar | 382/173 |

OTHER PUBLICATIONS

Watanabe, et al "Layout Recognition of Multi–Kinds of Table–Form Documents", IEEE, pp. 432–445, Apr. 1995.

*Primary Examiner*—Phuoc Tran
*Assistant Examiner*—Daniel G. Mariam
*Attorney, Agent, or Firm*—Myers Bigel Sibley & Sajovec; A. Bruce Clay

[57] ABSTRACT

Information in the form is analyzed based on adjacency relationships among cells in the forms. By using adjacency relationships, a format may be provided for forms which are divided into cells by separators such as lines, notwithstanding that the positions and sizes of the cells may change, as long as their order remains unchanged. In particular, cells are extracted from the image data of a form. Adjacency relationships among the extracted cells are determined. The determined adjacency relationships are compared with a set of adjacency relationships are compared with a set of adjacency relationships in order to identify the extracted cells. Information contained in the form is then recognized based upon the identified extracted cells. In particular, the information contained in the form is recognized, based upon the identified cell in which the information is contained.

30 Claims, 13 Drawing Sheets

(A)

(B)

(C)

|           | Name (H) | Name (T) | Zip (H) | Zip (T) | Addr (H) | Addr (T) | Phone (H) | Phone (T) |
|-----------|----------|----------|---------|---------|----------|----------|-----------|-----------|
| Name(H)   |          | TB       |         |         | LR       |          |           |           |
| Name(T)   |          |          | TB      |         |          | LR       |           |           |
| Zip(H)    |          |          |         | TB      |          |          | LR        |           |
| Zip(T)    |          |          |         |         |          |          |           | LR        |
| Addr(H)   |          |          |         |         |          | TB       |           |           |
| Addr(T)   |          |          |         |         |          |          | TB        |           |
| Phone(H)  |          |          |         |         |          |          |           | TB        |
| Phone(T)  |          |          |         |         |          |          |           |           |

(A)

|           | Name (H) | Name (T) | Zip (H) | Zip (T) | Addr (H) | Addr (T) | Phone (H) | Phone (T) |
|-----------|----------|----------|---------|---------|----------|----------|-----------|-----------|
| Name(H)   |          | TB       |         |         | L        |          |           |           |
| Name(T)   |          |          | TB      |         |          |          |           |           |
| Zip(H)    |          |          |         | TB      |          |          |           |           |
| Zip(T)    |          |          |         |         |          |          |           | R         |
| Addr(H)   |          |          |         |         |          | TB       |           |           |
| Addr(T)   |          |          |         |         |          |          | TB        |           |
| Phone(H)  |          |          |         |         |          |          |           | TB        |
| Phone(T)  |          |          |         |         |          |          |           |           |

(B)

|           | Name (H) | Name (T) | Zip (H) | Zip (T) | Addr (H) | Addr (T) | Phone (H) | Phone (T) |
|-----------|----------|----------|---------|---------|----------|----------|-----------|-----------|
| Name(H)   |          | TB       |         |         | L        |          |           |           |
| Name(T)   |          |          | T       |         |          | R        |           |           |
| Zip(H)    |          |          |         | TB      |          |          | L         |           |
| Zip(T)    |          |          |         |         |          |          |           | R         |
| Addr(H)   |          |          |         |         |          | TB       |           |           |
| Addr(T)   |          |          |         |         |          |          | B         |           |
| Phone(H)  |          |          |         |         |          |          |           | TB        |
| Phone(T)  |          |          |         |         |          |          |           |           |

|          | Name (H) | Name (T) | Zip (H) | Zip (T) | Addr (H) | Addr (T) | Phone (H) | Phone (T) |
|----------|----------|----------|---------|---------|----------|----------|-----------|-----------|
| Name(H)  |          | TB       |         |         | L        |          |           |           |
| Name(T)  |          |          | T       |         |          |          |           |           |
| Zip(H)   |          |          |         | TB      |          |          |           |           |
| Zip(T)   |          |          |         |         |          |          |           | R         |
| Addr(H)  |          |          |         |         |          | TB       |           |           |
| Addr(T)  |          |          |         |         |          |          | B         |           |
| Phone(H) |          |          |         |         |          |          |           | TB        |
| Phone(T) |          |          |         |         |          |          |           |           |

FIG. 5

| Name(H) | Name(T) | Zip(H) | Zip(T) |
|---|---|---|---|
| Address(H) | Address(T) | Phone(H) | Phone(T) |

FIG. 7

| | | Horizontal line | | | | | | | | | | Vertical line | | | | |
|---|---|---|---|---|---|---|---|---|---|---|---|---|---|---|---|---|
| | | line | | information | | | | | | | | line | | information | | |
| A | Upper | | | | | | | | | a | Left | A | N(H) | B | | |
| | Lower | b | N(H) | a | N(T) | c | Z(H) | d | Z(T) | h | | Right | A | N(T) | B | | |
| B | Upper | b | N(H) | a | N(T) | c | | | | | b | Left | | | | | |
| | Lower | b | A(H) | e | A(T) | f | | | | | | Right | A | N(H) | B | A(H) | D |
| C | Upper | c | Z(H) | d | Z(T) | h | | | | | c | Left | A | N(T) | B | | |
| | Lower | f | p(H) | g | p(T) | h | | | | | | Right | A | Z(H) | C | | |
| D | Upper | b | A(H) | e | A(T) | f | p(H) | g | p(H) | h | d | Left | A | Z(H) | C | | |
| | Lower | | | | | | | | | | | Right | A | Z(T) | C | | |
| | | | | | | | | | | | e | Left | B | A(H) | D | | |
| | | | | | | | | | | | | Right | B | A(T) | D | | |
| | | | | | | | | | | | f | Left | B | A(T) | D | | |
| | | | | | | | | | | | | Right | B | p(H) | D | | |
| | | | | | | | | | | | g | Left | C | p(H) | D | | |
| | | | | | | | | | | | | Right | C | p(T) | D | | |
| | | | | | | | | | | | h | Left | A | Z(T) | C | T(T) | D |
| | | | | | | | | | | | | Right | | | | | |

FIG. 9

|   | A | B | C | D | a | b | c | d | e | f | g | h |
|---|---|---|---|---|---|---|---|---|---|---|---|---|
| A |   |   |   |   |   |   |   |   |   |   |   |   |
| B |   |   |   |   |   | X |   |   |   |   |   |   |
| C |   |   |   |   |   |   |   |   |   |   |   | X |
| D |   |   |   |   |   |   |   |   |   |   |   |   |
| a | X | X |   |   |   |   |   |   |   |   |   |   |
| b |   |   |   |   |   |   |   |   |   |   |   |   |
| c | X |   |   |   |   |   |   |   |   |   |   |   |
| d | X |   | X |   |   |   |   |   |   |   |   |   |
| e |   | X |   | X |   |   |   |   |   |   |   |   |
| f |   |   |   | X |   |   |   |   |   |   |   |   |
| g |   |   | X | X |   |   |   |   |   |   |   |   |
| h |   |   |   |   |   |   |   |   |   |   |   |   |

FIG. 10

(A) Format (B) Extracted line segment (C) After analysis

METHODS, SYSTEMS AND COMPUTER PROGRAM PRODUCTS FOR ANALYZING INFORMATION IN FORMS USING CELL ADJACENCY RELATIONSHIPS

FIELD OF THE INVENTION

The present invention relates to methods, systems and computer program products for analyzing a layout of a document, and, more particularly, to methods, systems and computer program products for analyzing a layout of a form.

BACKGROUND OF THE INVENTION

Forms are widely used in many consumer and commercial environments. Presently, forms are being processed by computers to enhance efficiency. As used herein, a form is a particular type of document. A form has a number of horizontal and vertical separators such as lines therein. Regions surrounded by these lines are called cells. A cell may be a region previously printed on the form itself such as "Name" (a header field), or a text field in which a user specifically fills in his or her name or address. These fields are laid out on the form in a predefined layout.

Generally, a system which processes a form captures an image of the form (bitmap) using a reader device such as an OCR so that the form processing system can extract necessary information from the form. The layout of the form is determined by analyzing the image on the basis of a format previously stored in the memory of the computer system. The format is a model for analyzing the layout of form. The layout of the form is analyzed by referring to this model for comparison. The analysis enables the system to identify what information such as an address or name exists at a predefined position on the form, and to recognize images of characters, numbers and symbols actually existing at that position as text by using well known character recognition techniques. This allows the system to recognize the information filled in that position as a text.

A simple conventional format is defined on the basis of positions and length of lines previously printed on the form, and characters previously printed (headers). In other words, the format is a blank form in which nothing is entered. Based on such a format, the blank form is erased from the bitmap of the form actually read by the reader device, and analyzed for the layout of the form. Thus, information on the form is identified.

FIG. 1 shows samples of specific forms. These three samples A, B and C differ from each other in the positions and length of lines therein. Conventionally, forms which can be handled with one format are generally limited to those in which positions and lengths of lines existing in the form exactly match the information of the format. Thus, the layout of the three samples of FIG. 1, generally cannot be readily analyzed with one format. Therefore, different formats corresponding to each of the samples A, B and C are generally provided. Since the memory area for storing data of respective formats may increase, excessive memory may be used. In addition, every time the form processing system receives a form, it may need to verify to which form it corresponds, so that the speed for processing the form may decrease. The decrease in processing speed may become significant as the number of forms to be processed increases.

In order to make it possible to accommodate a plurality of different forms which have different layouts with a single format, a technique has been proposed which defines a format based on an order of drawing lines in the form instead of using strict matching of positions or length of lines as the reference. In the sample B of FIG. 1, for example, the entire form is first divided into upper and lower areas by traversing it (Line 1). Then, the divided upper and lower areas are further vertically divided (Lines 2 and 3), so that the upper area is divided into a "Name area" and a "Zip area," and the lower area is divided into an "Address area" and a "Phone area." Furthermore, respective areas are vertically divided into a header area and a text field (Lines 4, 5, 6, and 7).

The format for sample B which is defined by the order of line drawing in the form, can be applied to a form in which the Line 5 in FIG. 1(B) is replaced with a Line 5', because the order of line drawing is unchanged. However, this format generally cannot be applied to the sample C in which the order differs from that for the sample B. In the case of sample C, the entire form is first vertically divided (Line 1) so that the form is divided into two right and left areas. Then, the divided right and left areas are horizontally divided (Lines 2 and 3).

Since the forms of FIGS. 1(B) and (C) differ from each other in the order of line drawing, they generally are represented by different formats. Therefore, this approach may not handle the three samples shown in FIG. 1 with a single format. In addition, when a format is produced from an actual form, or when a format is updated with a new form, expertise may be necessary to perform such operation.

SUMMARY OF THE INVENTION

It is therefore an object of the present invention to provide methods, systems and computer program products for analyzing information in a form with a specific layout.

It is another object of the present invention to provide methods, systems and computer program products which can analyze information in a form which is divided into cells by separators such as lines, wherein the cells are in various positions and sizes, while the order of arranging the cells remains the same.

It is yet another object of the present invention to provide methods, systems and computer program products which can analyze a layout of a form so that the form can be efficiently handled.

These and other objects are provided, according to the present invention, by methods for analyzing information in a form, based on adjacency relationships among a plurality of cells in the form. By using adjacency relationships, a format may be provided for forms which are divided into cells by separators such as lines, notwithstanding that the positions and sizes of the cells may change, as long as their order remains unchanged.

In particular, methods for analyzing information in a form from image data of the form which is stored in a computer system includes the steps of extracting a plurality of cells from the image data of the form. Adjacency relationships among the plurality of extracted cells are determined. The determined adjacency relationships are compared with a set of adjacency relationships which are stored in the computer system. The plurality of extracted cells are identified based on the compared adjacency relationships. The information contained in the form is then recognized based upon the identified plurality of extracted cells. In particular, the information contained in the form is recognized based upon the identified cell in which the information is contained.

Prior to performing the comparison, a set of adjacency relationships is identified in cells of at least one sample form and the type of information which is contained in each of the cells of the sample form is associated with that cell. The set of adjacency relationships and the associated types of information are stored in the computer system as a format for use during the comparison.

Various types of adjacency relationships may be used according to the present invention. For example, the stored adjacency relationships may define lines which are shared by the cells. The cells may be correlated to common nodes and common edges, such that the common nodes are connected by edges. The cells may also be described as a collection of lines and the connections among the collection of lines may be identified. Dependencies among the collection of lines may also be identified.

According to another aspect of the present invention, methods are provided for producing format data for analyzing layouts of a plurality of forms with different arrangements of cells. At least one form sample is prepared in which a plurality of cells are arranged in a predetermined manner. Image data of the at least one form sample is stored in a computer system. A plurality of cells is extracted from the image data. Adjacency relationships are determined among the plurality of cells. The plurality of cells are correlated to nodes and the adjacency relationships are correlated to edges, such that the nodes and edges provide format data for the forms. This format data can then be used for later analysis as described above.

In correlating the plurality of cells to nodes and adjacency relationships to edges, lower order format data may be generated in which the plurality of cells are correlated to nodes and the adjacency relationships are correlated to edges. Format data is then generated from the lower order format data, in which the plurality of cells are correlated to nodes and the adjacency relationships common to the lower order format data are correlated to edges. In performing the correlation, a line shared by adjacent cells may be used to represent the adjacency relationship between adjacent cells. Also, the cells may be represented using an aggregation of lines. After the correlation is performed, it may be verified whether all the nodes in the format data are connected by edges. Accordingly, formats may be generated and forms may be analyzed using cell adjacency relationships, so that forms can be accurately analyzed even though the cell shape and size may change, as long as the order of arranging the cells remains unchanged.

BRIEF DESCRIPTION OF THE DRAWINGS

FIGS. 4(a)–4(c) are tables summarizing the adjacency relationships between all cells in a sample.

FIG. 5 is a table listing higher order formats generated on the basis of the lower order formats in FIGS. 4(a)–4(c).

FIG. 7 is a diagram showing the higher order formats in FIG. 5.

FIG. 9 is a table of formats in FIG. 5 converted into a representation with lines.

FIG. 10 is a table showing dependency between the lines.

DETAILED DESCRIPTION OF PREFERRED EMBODIMENTS

Figure 1:
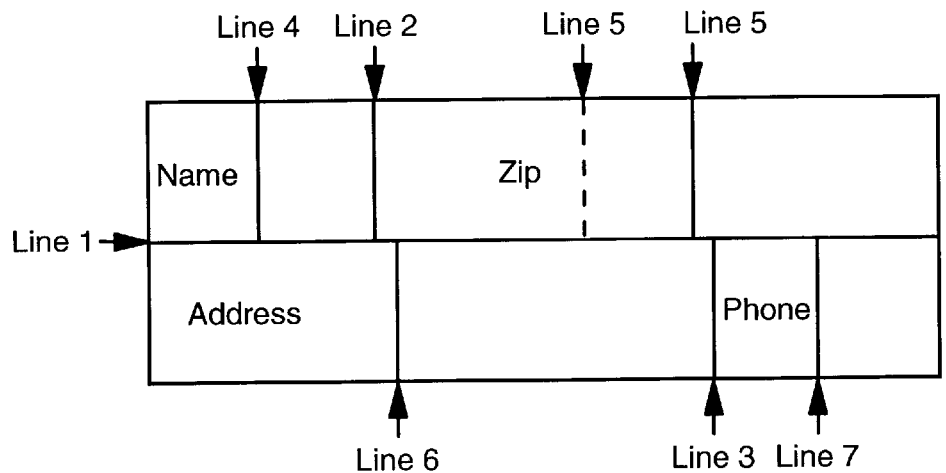
FIGS. 1(A)–1(C) are samples of a specific form.
Figure 1:
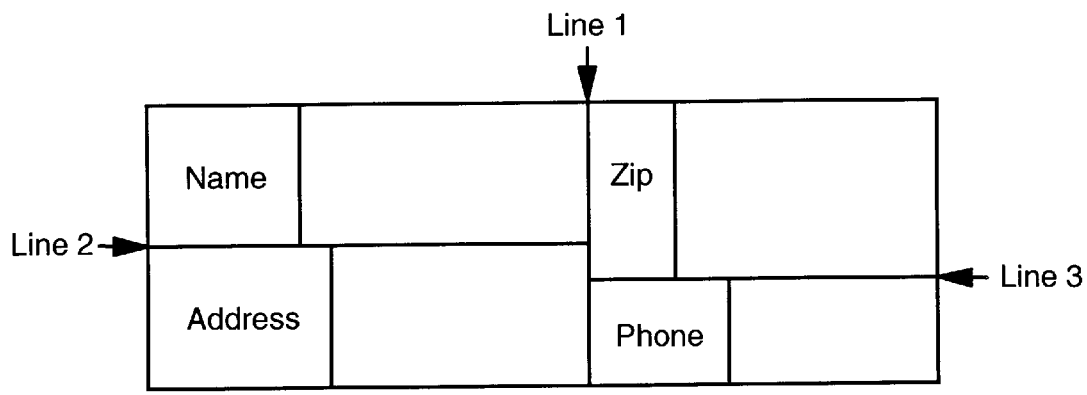

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described herein with reference to flowcharts. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

A form for which a layout can be analyzed according to the present invention includes a plurality of cells (predetermined regions in the form) arranged in a predefined manner. A typical form includes a format. Usually, a cell is divided by separators such as lines and blank spaces. In a form, a header area previously entered with "name" and a text area to which a name is specifically entered are cells. In the following description, a typical application of the present invention is described for analysis of a layout of form.

Generation of Format

A format is a model for analyzing a layout of a form. The layout of a form is analyzed by referring to this model. The format defines a type of information existing in the cell, and an adjacency relationship between the cells. In general, the format is first uniquely described, and all cells from the form are identified by tracing relations of cells such as fields in the format. The format is described on the basis of an adjacency relationship between the cells in the form. Formats with different length and positions of lines can be accommodated with one format by noticing the adjacency relationship between the cells. Specifically, it becomes possible to apply the same formats to the three samples shown in FIGS. 1(A)–1(C).

The format may be represented by a directed graph, the nodes of which are correlated to the cells in the form, and the edges of which are correlated to adjacency relationships between the cells. The format can uniquely represent the form which is an aggregation of cells which are rectangles surrounded by lines. FIG. 2 is a flowchart showing operations for generating a format. Respective steps are described with reference to the samples of FIGS. 1(A), 1(B) and 1(C).

Extraction of Cells From Samples (Step 201)

A form includes fields which are surrounded and separated by lines or other separators. In addition, the smallest area existing in the form and surrounded by lines is called a cell. It is preferable that each cell is a quadrangle, and there is no gap (non-cell area) between adjacent cells. In the following description, an example is used where the cells are physically adjacent. However, "adjacent" in the present invention is not limited to the above case. Rather, even if the cells are separated, they can be considered to be in an adjacent state as long as certain conditions are met. That is, adjacent referred to herein is defined as a state where cells contact one line or a plurality of lines on one straight line on the same side, and a state where cells are separated without intervening other cells on the same side.

At step 201, cells corresponding to nodes of the graph are extracted. For the sample A, eight cells, that is, "Name (H)," "Name (T)," "ZIP (H)," "ZIP (T)," "Address (H)," "Address (T)," "Phone (H)," and "Phone (T)" are obtained. Here, (H) represents a header previously printed on the form, while (T) represents text to be entered. For example, the cell "Name (H)" indicates a rectangular area where the previously printed characters "Name" exist, while the cell "Name (T)" is a blank field at the right thereto, and an entering field where a name is actually entered.

Generation of Lower Order Format (Step 202)

For the cells obtained in step 201, a lower order format is generated on the basis of their adjacency relationships. A lower order format is generated for each sample. Generation of these lower order formats is a pretreatment for generating the higher order formats which are finally required. The lower order format is represented as a directed graph, the nodes of which are correlated to the cell obtained in step 201, and the edges of which are correlated to the adjacency relationship between the cells.

Figure 3:
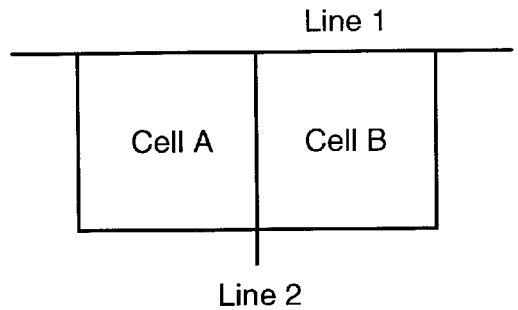
FIG. 3 is a diagram illustrating adjacency relationships between cells.
Figure 3:
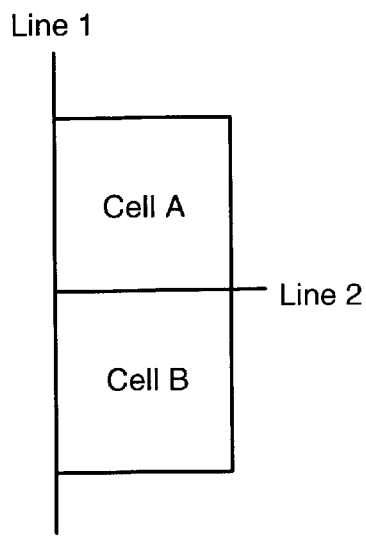
Figure 3:
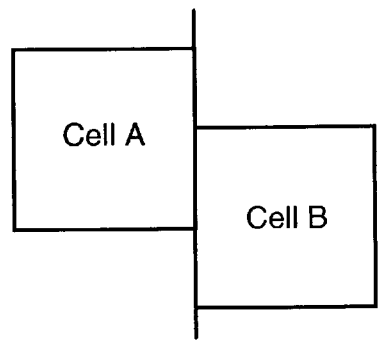

The adjacency relationship is described in detail in FIGS. 3(a)–3(c). Information on the adjacency relationship is information indicating whether or not one cell is adjacent to another cell, and, if it is adjacent, which of upper, lower, right or left of the cell is adjacent to another cell. A state where the cell A and the cell B are arranged as shown in FIGS. 3(a) and 3(b) indicated that the cells A and B are in an adjacency relationship. When the cells are adjacent in such a manner, it is indicated that the cells A and B share Line 1. For Line 2, since the cells A and B contact the Line 2 on the opposite sides, it is not said that the Line 2 is shared by the cells A and B. Similarly, the cells A and B shown in FIG. 3(c) are not adjacent.

Information on the adjacency relationship includes information on which line the cells share. That is, it is identified which of a left line, a right line, an upper line, or a lower line a line that a cell shares with another cell. For example, for the sample of FIG. 1(A), the cells "Name (H)" and "Name (T)" share both the upper and lower lines. In addition, the cells "Name (H)" and "Address (H)" share the left and right lines. FIG. 4(a) is a table summarizing adjacency relationships between all cells in such sample A. In the table, a symbol "R" means that two cells share the right line. Similarly, symbols "L," "T," and "B" mean that the left line, the upper line, and the lower line are shared, respectively.

The lower order format of the sample A is represented as a directed graph, which is equivalent to the table of FIG. 4(a). Nodes of the graph are correlated to the cells. In addition, it is sufficient for the directed edge of the graph that its start point is correlated to a cell in the left end column of the table, and its end point is correlated to a cell in the uppermost row of the table. T, B, L, and R in the table are shared edges. Since the relation between cells may be better understood with a list that is equivalent to a directed graph as shown in FIG. 4, rather than with the representation with such directed graph, in the description that follows, a format will be represented by such a table.

Generation of Lower Order Formats for All Samples (Step 203)

The lower order formats are generated for all samples. If all samples are not yet processed, steps 201 and 202 are executed for unprocessed samples. Accordingly, the lower order formats are generated for the samples B and C shown in FIGS. 1(A)–1(C) as was done for sample A of FIG. 1(A). FIGS. 4(b) and (c) are the lower order formats for the samples B and C, respectively.

Generation of Higher Order Format (Step 204)

To process a plurality of forms with one format, information common to the forms is extracted. To this end, the higher order formats are determined by extracting only common adjacency relationships from the plurality of lower order formats obtained in step 203. According to the table of FIG. 4, since all the samples A, B and C have a common relation of "TB" with the cells "Name (H)" and "Name (T)," it can be understood that all samples share the node and the lower line. In addition, since only "L" is common to the cells "Name (H)" and "Name (T)," it can be understood that all samples share the left line. Thus, the higher order formats are generated by extracting only information common to all lower order formats. FIG. 5 is a table showing the higher order formats based on the lower order formats of FIG. 4.

Verification of Higher Order Format (Step 205)

Figure 6:
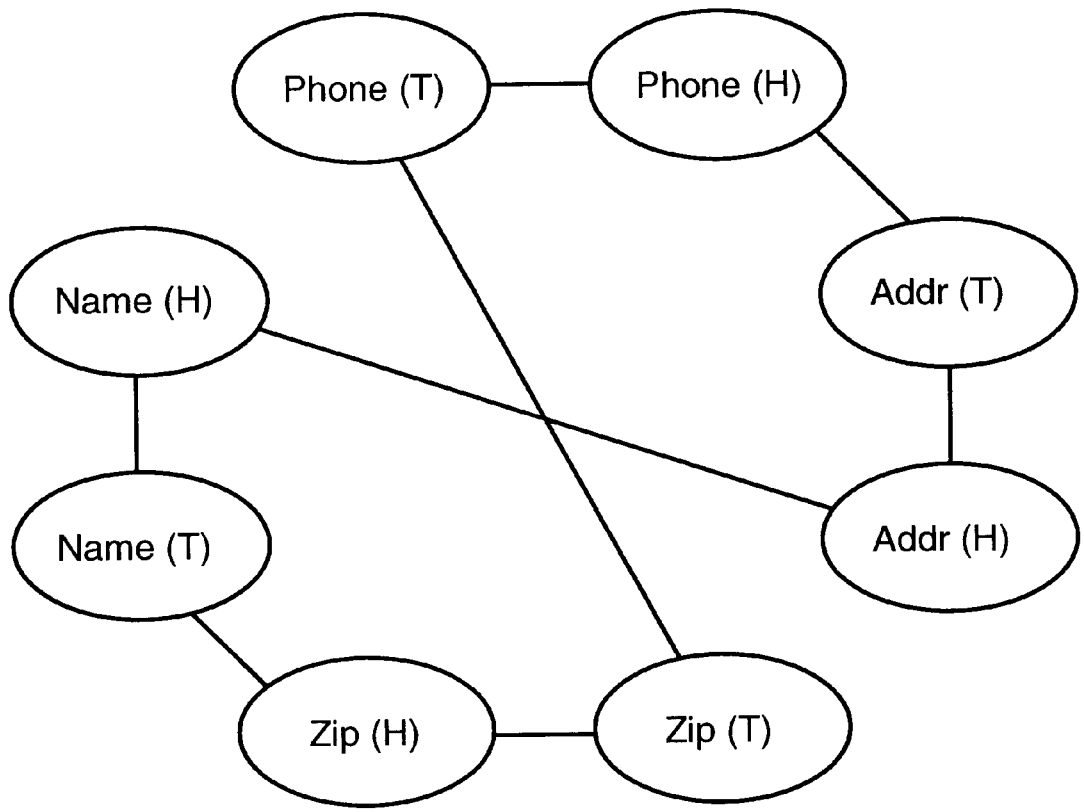
FIG. 6 is an undirected graph showing connectedness of the higher order formats in FIG. 5.

Whether or not the higher order formats generated in step 204 can be applied to all samples is verified by confirming connectedness of the cells. That is, when the directed graph representing the higher order format is converted into an undirected graph, it is determined whether or not it is a connected graph. FIG. 6 shows undirected graphs of the higher order formats (FIG. 5) obtained from the samples A, B and C. Since these graphs are connected graphs, the higher order formats are formats applicable to these samples.

Since formats of the embodiment uses the adjacency relationship between the cells, a cell should always be traced by the adjacency relationship with another cell. The fact that the higher order format is a connected graph means that all cells can be traced by following the adjacency relationship with other cells from any cell as the reference. Accordingly, the higher order format would be applicable for all samples.

If the higher order format is not a connected graph, this format generally has insufficient information for identifying a cell, so that cells which cannot be identified with an adjacency relationship may occur. When the generated format is incomplete as above, the number of samples may be reduced by removing sample C from the subject, and performing the above steps, thereby to generate a complete format. In this case, another format is generated for sample C.

The type of form which can be processed with one format will now be described. First, when the formats represented by the table of FIG. 4 are represented by a diagram, it becomes as shown by FIG. 7. In FIG. 7, the representation of a circle indicates that cells are not adjacent around the intersection. This intersection is called a "non-LSA (non-Line Shared Adjacent) point". Therefore, since the line shared by the cells passes through a non-LSA point, "Name (T)" is not adjacent to "Address (T)," and "Zip (H)" is also not adjacent to "Phone (H)." Intersections other than a non-LSA point are called LSA points. Samples of three forms shown in FIG. 1 can be represented by one format represented by FIG. 7. Differences between these three samples lie in differences in combinations of cells. This is referred to as "difference of cell layout." Thus, three layouts of cells can be represented with one non-LSA point.

Layouts of the samples A, B and C can be analyzed with one format by using the higher formats (FIG. 5) which provide the connected graph as shown in FIG. 6. Based on such format, it is possible to identify from the bitmap of a form actually read by a reader what information exists at predefined locations in the form. Then, text which is information to be extracted is extracted by recognizing characters and symbols as images existing at that position, using conventional character recognition technology.

Figure 2:
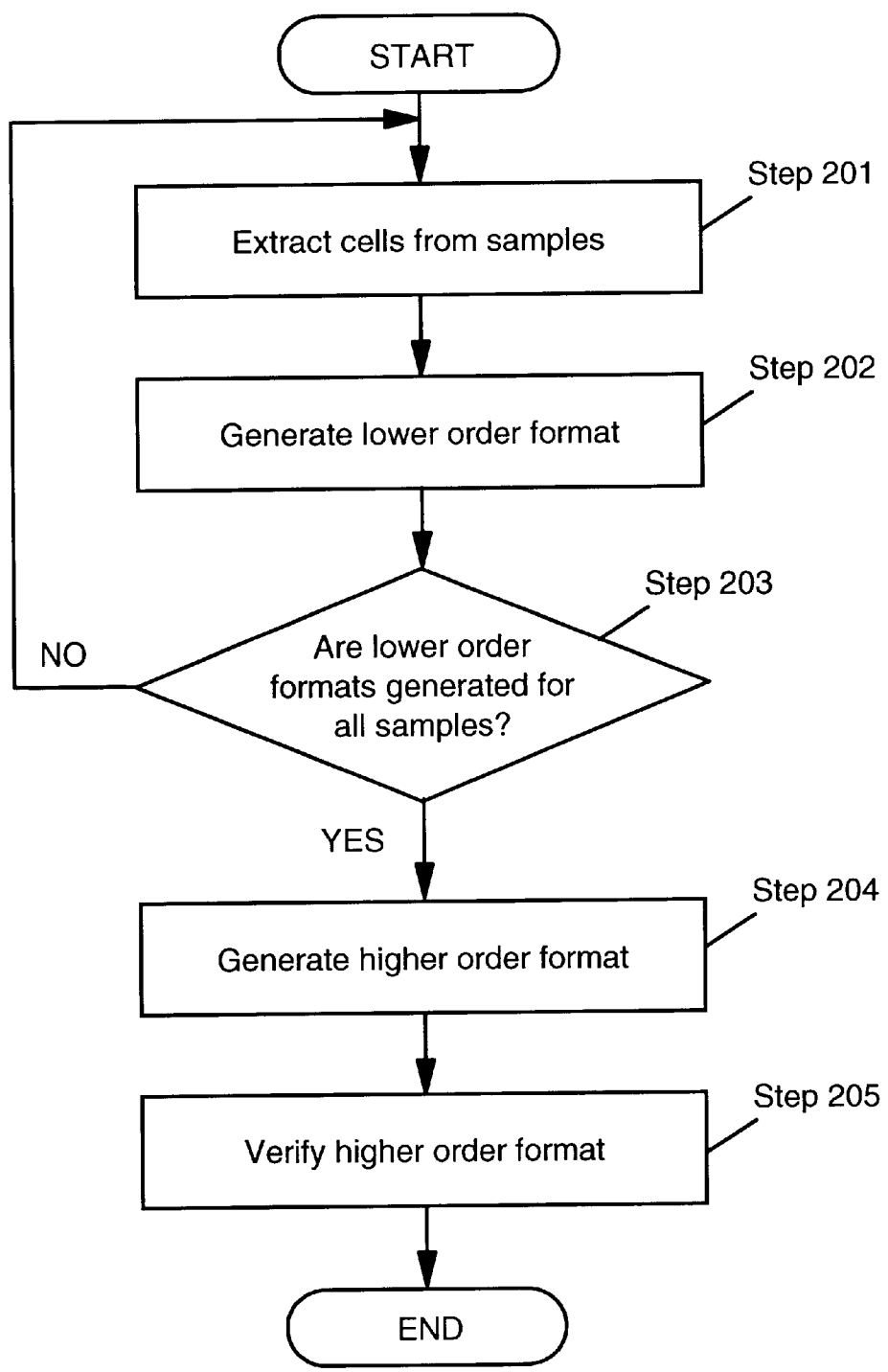
FIG. 2 is a flowchart illustrating operations for generating a format according to the invention.

Even if a form has a layout other than those of the samples A, B and C shown in FIG. 1, as long as the adjacency relationship between the cells matches the higher order format, the layout can be analyzed with this format.

Processing of Actual Form With Format

Basically, a format is defined by a graph based on the adjacency relationship between cells. When an actual form is processed by using this format, the following procedure may be used:

(1) Extract lines from the image of the form through form analysis;

(2) Extract cells by looking for areas surrounded by lines; and (3) Determine that they are cells by comparing actual cells with the cell information in the format.

The format described on the basis of the adjacency relationship between cells is basically applied on the assumption that the cells are identified from the image data of the form. Accordingly, in applying the format, it is first assumed that cells surrounded by lines are identified. However, when an actual form is processed, lines may be lost due to blur, or extra line segments may be extracted due to dirt. This may cause a cell not to be recognized as a cell because it is not perfectly surrounded due to blur in the lines. Then, when a form is actually processed, it is preferable to represent the description of cells in a format with lines so that the cells are properly recognized and the format can be effectively applied. That is, a representation of the adjacent cell format by adjacent information between the cells is converted into an equivalent representation by lines.

Information on the adjacency relationship is four of a pair of adjacent cells, shared lines, and lines existing between the cells. For the state shown in FIG. 3(a), for example, they are the cells A and B, and the Lines 1 and 2. Based on these adjacency relationships between the cells, the following information is obtained for each line:

(1) The upper end of Line 2 is on the Line 1 (connects the Line 1);

(2) The position of the lower end of the Line 2 is undetermined; and (3) The positions of the right and left ends of the Line 1 are undetermined.

In addition, for the state shown in FIG. 3(b), the following information is obtained for each line:

(1) The left end of the Line 2 is on the Line 1 (connects the Line 1);

(2) The position of the right end of the Line 2 is undetermined; and (3) The positions of the upper and lower ends of the Line 1 are undetermined.

The undetermined end positions are determined by information on the adjacency relationship between the cells. Thus, conversion is performed to represent the cells with an aggregation of lines. This conversion is applied to the entire format to determine information on the lines and these end points. The information on the lines and the end points to be determined should follow the following rules:

(1) If the determined line is an extension of an existing line, extend the existing line without creating a new line; and (2) If the end points of a line are determined, add a new end point to which information on multiple end points is provided even if that line has information on the end point.

Figure 8:
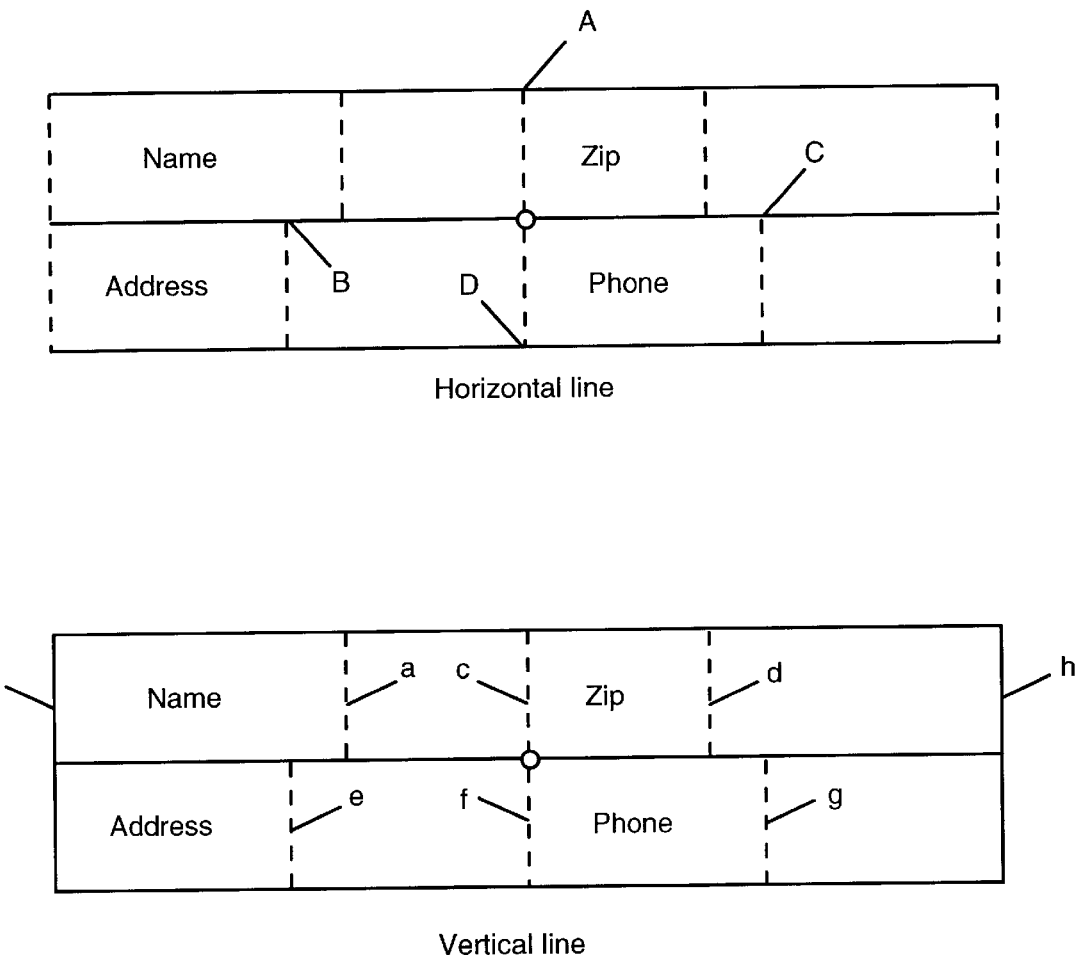
FIG. 8 is a diagram representing FIG. 7 in lines.

Following such rules, the format of FIG. 7 can be represented by four horizontal lines (Lines A through D) and eight vertical lines (Lines a through h) as shown in FIG. 8. It should be noted that, although the Lines B and C are extensions of existing lines, they are made separate lines because they pass through non-LSA points. The same is true for the Lines c and f.

When the table of format shown in FIG. 5 is converted into the representation with such lines (FIG. 8), the table shown in FIG. 9 is obtained. Here, representations of "N ( )," "A ( )," "Z ( )," and "P ( )" indicate "Name ( )," "Address ( )," "Zip ( )," and "Phone ( )," respectively. The representations H and T in the parentheses indicate a header and a text, respectively. For example, the horizontal Line A contacts the vertical Lines b and a at its lower side to constitute the cell N (H). In addition, the horizontal Line B contacts the vertical Lines a and c at its upper side to constitute the cell N (T). On the other hand, the vertical line a contacts the horizontal Line A and B at its left side to constitute the cell N (H), and contacts the horizontal Lines A and B at its right side to constitute the cell N (T).

In addition, the format preferably also defines dependencies between these lines. Each line contacts another line at its end point. When one line is searched in an actual form, if the position of another line contacting an end of that one line is previously defined, the position of end point of that one line can be identified to some extent. For example, when the upper end of a vertical line is connected to a horizontal line, if the position of the horizontal line is identified, the Y coordinate value of the upper end of the vertical line is identified. The horizontal direction is assumed to be X coordinate, while the vertical direction is assumed to be Y coordinate. In the examples of FIGS. 2 (a) and (b), the Line 2 depends on the Line 1.

For the lines in the format of FIG. 9, the dependencies of a line are determined on the basis of the connecting relations of end points of the line. When a dependency graph obtained from the table of FIG. 9 is represented in a table form, a table shown in FIG. 10 may be obtained. When the lines in the left end column of this table depend on the lines in the top row, "X" is marked.

In generating the dependency of lines, the vertical and horizontal lines are treated without distinction. In addition, lines on the outer periphery (Lines A, D, b, and h) are treated as if they do not depend on other lines. The line on the outer periphery is for the vertical lines (Lines b and h), a line not connected to other lines on either one of the left or right side, and not having contact point information; and, for the horizontal lines (Lines A and D), is a line not connected to other lines on either one of the upper or lower side, and not having contact point information. However, if the dependency of lines is looped, the dependency is cut at a suitable position to eliminate the closed loop.

When the adjacency relationship between cells in the format is described by lines, as described above, to determine the dependency of the lines, the line can be effectively extracted even if the line extracted from an actual form is blurred or dirty, so that a cell can be identified. The line can be extracted because length of a line is determined by the positions of both ends of a line to which it depends. Therefore, the length and position of the line can be estimated from the lines at both ends even if it is blurred. This makes it possible to accurately extract a line, not only when the line is blurred, but also when an intersection is blurred and cannot be determined.

Figure 11:
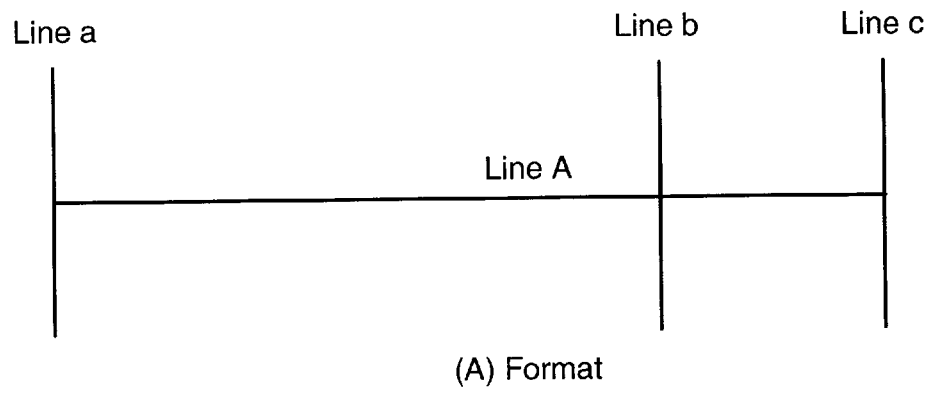
FIGS. 11(A)–11(C) are diagrams illustrating processing when extracted lines are blurred.
Figure 11:
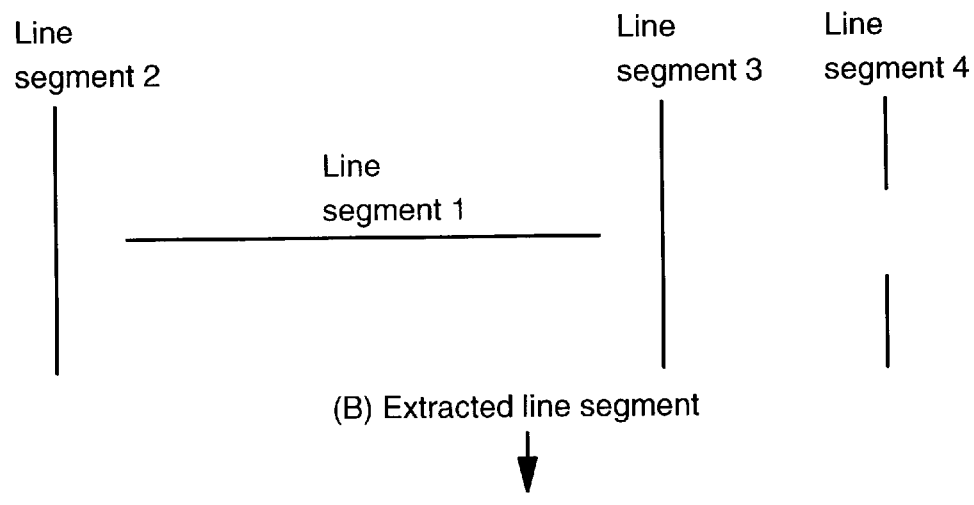
Figure 11:
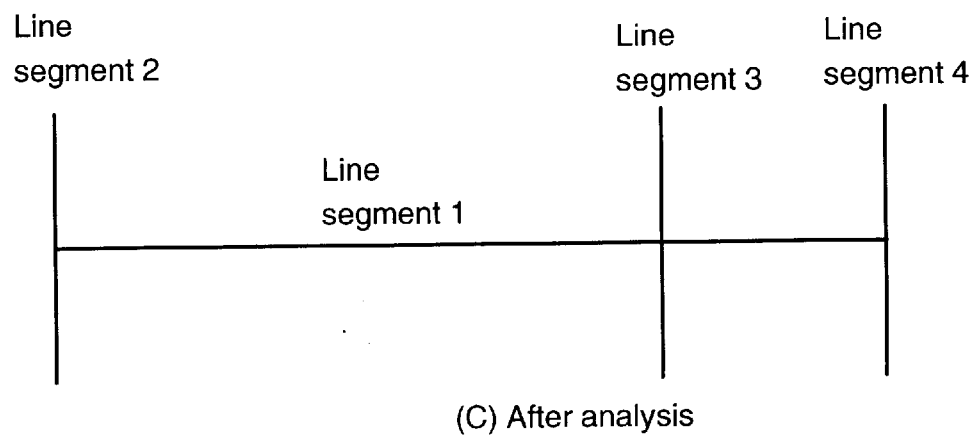

FIGS. 11(A)–11(C) illustrate processing when extracted lines blur. FIG. 11(A) shows a part of a format. A horizontal Line A depends on vertical Lines a and c. FIG. 11(B) shows components of actual lines extracted from an actual form. The extracted horizontal Line 1 blurs and does not reach the vertical Lines 2 and 4. In addition, the extracted vertical Line 4 blurs near the intersection with the horizontal Line 1. In such a case, since positions and length of the lines extracted from the form can be identified to some extent by referring to the dependency of the lines on the format, it becomes possible to determine that lines in FIG. 11(C) exist.

In addition, according to this method, it is possible to calculate cost based on difference between the number of other lines connecting to a line on the format and the number of connections of extracted lines, and to determine a combination which minimizes the cost as the final result. Accordingly, even if extra line segments are extracted due to dirt or the like, a case with least effect can be searched as a whole. Conventionally, once extra intersections or cells have been extracted due to extra line segments, they may significantly affect the subsequent analysis. According to the present method, influence by local dirt can be reduced and preferably eliminated.

Figure 12:
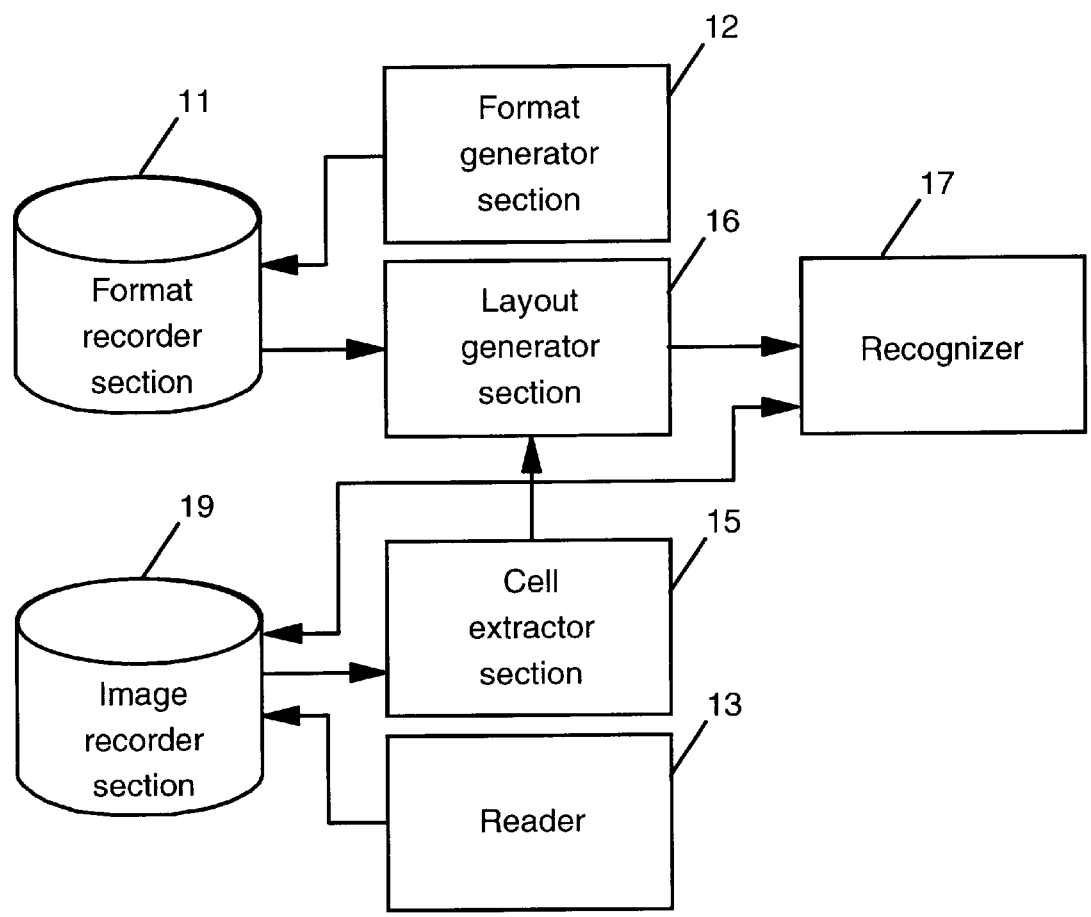
FIG. 12 is a block diagram of a form processing system.

FIG. 12 is a block diagram of a form processing system according to the invention. All of the elements of FIG. 12 may be included as part of a computer system. A format recorder section 11 records format information based on adjacency relationships between cells. Such information includes what information exists in respective cells (for example, address, name, phone number, etc.) and the adjacency relationships between cells. As described above, the adjacency relationship between cells may be represented by lines. A format generator section 12 generates a format from form samples and determines connectedness of the cells. In addition, the format generator section 12 updates an existing format based on a form sample having a new layout. If a format generated on the basis of a new sample cannot assure the connectedness of the cells, the generated format is incomplete. Accordingly, in such a case, a format conforming to the new sample is generated without updating the existing format, and is stored in the format recorder section 11.

A reader 13 generates image data of the form by scanning the form. The image data is recorded in an image recorder section 14. A cell extractor section 15 extracts cells (vertical and horizontal lines) from the image data of the form, and determines the adjacency relationship between cells from the image data. A layout analyzer section 16 matches the adjacency relationship between cells of the form extracted by the cell extractor section 15 with the adjacency relationship defined by the format stored on the format storage section 11, and identifies to which cell in the format a cell in the form corresponds by comparing them. This enables the layout analyzer section 16 to identify what information (for example, address) exists at a position in the form. A recognizer section 17 recognizes information existing at a position in the form (for example, characters, numerals, symbols and the like specifically entered as the address by the user) with conventional character recognition technology according to the result of analysis of the layouts of the form by the layout analyzer section 16.

Figure 13:
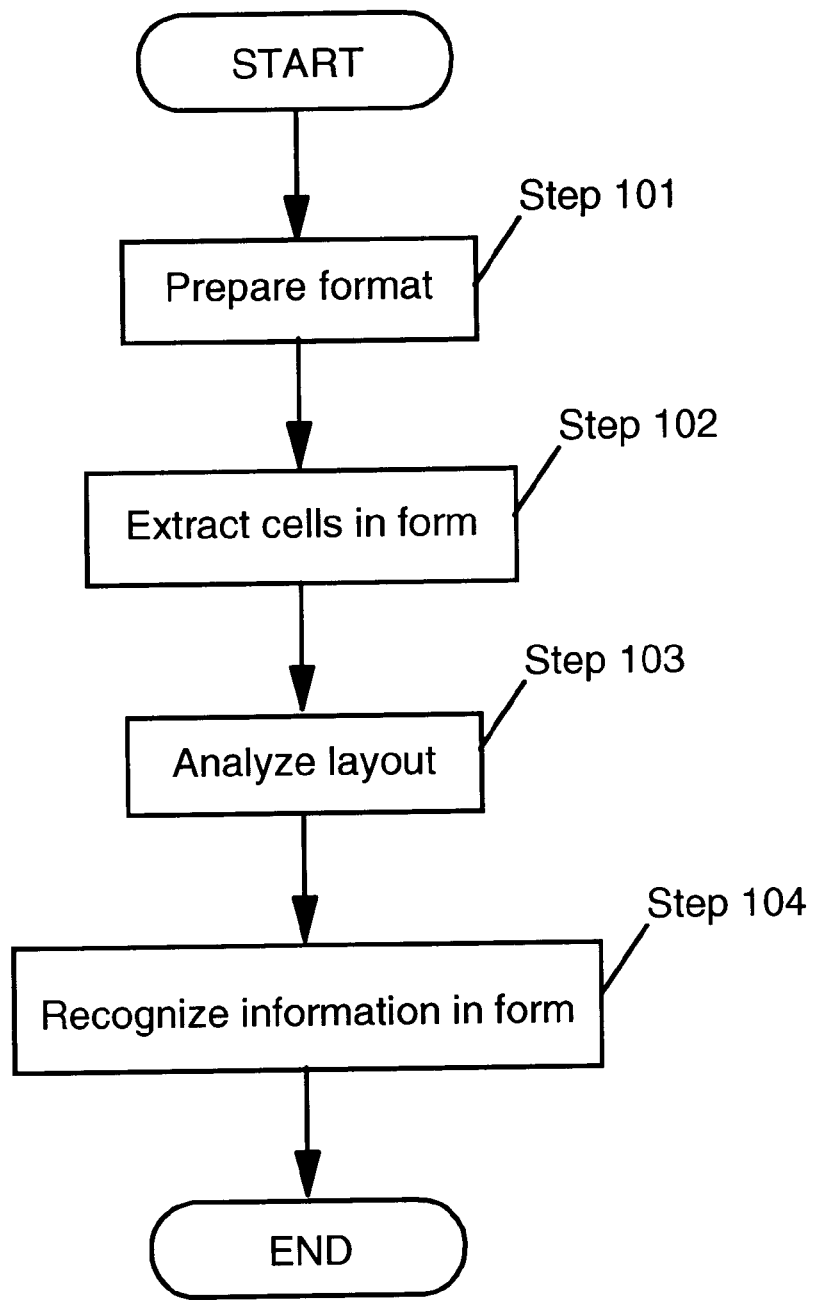
FIG. 13 is a flowchart showing operations for processing a form.

FIG. 13 is a flowchart illustrating operations for processing a form. First, a format which defines what information exists in each cell in the form is prepared, and the adjacency relationship between the cells is defined (step 101). This format is stored in the format storage section 11. Then, a plurality of cells are extracted from the form, and the adjacency relationship between the cells is determined (step 102). The adjacency relationship between the cells in the form is compared with the adjacency relationship defined by the format to identify to what cell in the format a cell in the form corresponds, thereby identifying what information exists at a position in the form (step 103). Then, the information existing at the identified position is recognized (step 104).

While the above embodiment was described for a case where the cells are separated by lines, the present invention may be applied to a form where cells are separated by demarcators or separators other than lines. For example, if there exist blanks with width wider than a certain width between cells, these blanks are considered to be separators, and can be treated similar to the lines.

As described, the present invention defines a format based on an adjacency relationship between cells. Accordingly, as long as the adjacency relationship between the cells in a form to be processed is the same as that defined in the format, the cells can be uniformly processed with one format even if their positions and sizes differ. Particularly, representing the adjacency relationship between the cells with a line enables it to effectively analyze a layout of a form even when the lines in the form are blurred or dirty.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for analyzing information in a form from image data of the form which is stored in a computer system, the analyzing method comprising the steps of:

extracting a plurality of cells from the image data of the form;

determining adjacency relationships among the plurality of extracted cells by generating lower order format data in which the plurality of cells are correlated to nodes and the adjacency relationships are correlated to edges and generating format data from the lower order format data in which the plurality of cells are correlated to nodes and the adjacency relationships common to the lower order format data are correlated to edges;

comparing the determined adjacency relationships with a set of adjacency relationships which are stored in the computer system;

identifying the plurality of extracted cells based on the compared adjacency relationships; and recognizing information contained in the form based upon the identified plurality of extracted cells.

2. A method according to claim 1 wherein the step of recognizing information comprises the step of:

recognizing information contained in the form based upon the identified cell in which the information is contained.

3. A method according to claim 1 wherein the step of comparing is preceded by the steps of:

identifying a set of adjacency relationships in cells of at least one sample form by generating lower order format data in which the plurality of cells are correlated to nodes and the adjacency relationships are correlated to edges and generating format data from the lower order format data in which the plurality of cells are correlated to nodes and the adjacency relationships common to the lower order format data are correlated to edges;

associating a type of information which is contained in each of the cells of the at least one sample form; and storing the set of adjacency relationships and the associated types of information in the computer system.

4. A method according to claim 1 wherein the stored adjacency relationships define lines which are shared by the cells.

5. A method according to claim 3 wherein the step of identifying a set of adjacency relationships in cells of at least one sample form comprises the steps of:

correlating the plurality of cells to common nodes; and correlating the plurality of cells to common edges.

6. A method according to claim 5 wherein all of the common nodes are connected by edges.

7. A method according to claim 3 wherein the step of identifying a set of adjacency relationships in cells of at least one sample form comprises the steps of:

describing the cells as a collection of lines; and identifying the connections among the collection of lines.

8. A method according to claim 7 further comprising the step of identifying dependencies among the collection of lines.

9. A method for producing format data for analyzing layouts of a plurality of forms with different arrangements of cells, comprising the steps of:

preparing at least one form sample in which a plurality of cells are arranged in a predetermined manner;

storing image data of the at least one form sample in a computer system;

extracting from the image data, a plurality of cells;

determining adjacency relationships among the plurality of extracted cells; and correlating the plurality of cells to nodes and correlating the adjacency relationships to edges, such that the nodes and edges provide format data for the forms, wherein the correlating step comprises the steps of;

generating lower order format data in which the plurality of cells are correlated to nodes and the adjacency relationships are correlated to edges; and generating format data from the lower order format data in which the plurality of cells are correlated to nodes and the adjacency relationships common to the lower order format data are correlated to edges.

10. A method according to claim 9 wherein the correlating step comprises the step of using a line shared by adjacent cells to represent the adjacency relationship between the adjacent cells.

11. A method according to claim 9 further comprising the step of verifying whether all of the nodes in the format data are connected by edges.

12. A method according to claim 9 wherein the correlating step comprises the step of representing the cells in the format data with an aggregation of lines.

13. A computer system for analyzing information in a form from image data of the form which is stored in the computer system, the analyzing system comprising:

means for extracting a plurality of cells from the image data of the form;

means for determining adjacency relationships among the plurality of extracted cells by generating lower order format data in which the plurality of cells are correlated to nodes and the adjacency relationships are correlated to edges and generating format data from the lower order format data in which the plurality of cells are correlated to nodes and the adjacency relationships common to the lower order format data are correlated to edges;

means for comparing the determined adjacency relationships with a set of adjacency relationships which are stored in the computer system;

means for identifying the plurality of extracted cells based on the compared adjacency relationships; and means for recognizing information contained in the form based upon the identified plurality of extracted cells.

14. A system according to claim 13 wherein the means for recognizing information comprises:

means for recognizing information contained in the form based upon the identified cell in which the information is contained.

15. A system according to claim 13 further comprising:

means for identifying a set of adjacency relationships in cells of at least one sample form by generating lower order format data in which the plurality of cells are correlated to nodes and the adjacency relationships are correlated to edges and generating format data from the lower order format data in which the plurality of cells are correlated to nodes and the adjacency relationships common to the lower order format data are correlated to edges;

means for associating a type of information which is contained in each of the cells of the at least one sample form; and means for storing the set of adjacency relationships and the associated types of information in the computer system.

16. A system according to claim 13 wherein the stored adjacency relationships define lines which are shared by the cells.

17. A system according to claim 15 wherein the means for identifying a set of adjacency relationships in cells of at least one sample form comprises:

means for correlating the plurality of cells to common nodes; and means for correlating the plurality of cells to common edges.

18. A system according to claim 17 wherein all of the common nodes are connected by edges.

19. A system according to claim 15 wherein the means for identifying a set of adjacency relationships in cells of at least one sample form comprises:

means for describing the cells as a collection of lines; and means for identifying the connections among the collection of lines.

20. A system according to claim 19 further comprising means for identifying dependencies among the collection of lines.

21. A computer program product for analyzing information in a form from image data of the form which is stored in the computer system, the analyzing system comprising:

computer instruction means for extracting a plurality of cells from the image data of the form;

computer instruction means for determining adjacency relationships among the plurality of extracted cells by generating lower order format data in which the plurality of cells are correlated to nodes and the adjacency relationships are correlated to edges and generating format data from the lower order format data in which the plurality of cells are correlated to nodes and the adjacency relationships common to the lower order format data are correlated to edges;

computer instruction means for comparing the determined adjacency relationships with a set of adjacency relationships which are stored in the computer system;

computer instruction means for identifying the plurality of extracted cells based on the compared adjacency relationships; and computer instruction means for recognizing information contained in the form based upon the identified plurality of extracted cells.

22. A computer program product according to claim 21 wherein the means for recognizing information comprises:

computer instruction means for recognizing information contained in the form based upon the identified cell in which the information is contained.

23. A computer program product according to claim 21 further comprising:

computer instruction means for identifying a set of adjacency relationships in cells of at least one sample form by generating lower order format data in which the plurality of cells are correlated to nodes and the adjacency relationships are correlated to edges and generating format data from the lower order format data in which the plurality of cells are correlated to nodes and the adjacency relationships common to the lower order format data are correlated to edges;

computer instruction means for associating a type of information which is contained in each of the cells of the at least one sample form; and computer instruction means for storing the set of adjacency relationships and the associated types of information in the computer system.

24. A computer program product according to claim 21 wherein the stored adjacency relationships define lines which are shared by the cells.

25. A computer program product according to claim 23 wherein the means for identifying a set of adjacency relationships in cells of at least one sample form comprises:

computer instruction means for correlating the plurality of cells to common nodes; and computer instruction means for correlating the plurality of cells to common edges.

26. A computer program product according to claim 25 wherein all of the common nodes are connected by edges.

27. A computer program product according to claim 23 wherein the means for identifying a set of adjacency relationships in cells of at least one sample form comprises:

computer instruction means for describing the cells as a collection of lines; and computer instruction means for identifying the connections among the collection of lines.

28. A computer program product according to claim 27 further comprising means for identifying dependencies among the collection of lines.

29. A system for producing format data for analyzing layouts of a plurality of forms with different arrangements of cells, comprising:

means for preparing at least one form sample in which a plurality of cells are arranged in a predetermined manner;

means for storing image data of the at least one form sample in a computer system;

means for extracting from the image data, a plurality of cells;

means for determining adjacency relationships among the plurality of extracted cells; and means for correlating the plurality of cells to nodes and correlating the adjacency relationships to edges, such that the nodes and edges provide format data for the forms, wherein the means for correlating comprises:

means for generating lower order format data in which the plurality of cells are correlated to nodes and the adjacency relationships are correlated to edges; and means for generating format data from the lower order format data in which the plurality of cells are correlated to nodes and the adjacency relationships common to the lower order format data are correlated to edges.

30. A computer program product for producing format data for analyzing layouts of a plurality of forms with different arrangements of cells, comprising:

computer instruction means for preparing at least one form sample in which a plurality of cells are arranged in a predetermined manner;

computer instruction means for storing image data of the at least one form sample in a computer system;

computer instruction means for extracting from the image data, a plurality of cells;

computer instruction means for determining adjacency relationships among the plurality of extracted cells; and computer instruction means for correlating the plurality of cells to nodes and correlating the adjacency relationships to edges, such that the nodes and edges provide format data for the forms, wherein the computer instruction means for correlating comprises:

computer instruction means for generating lower order format data in which the plurality of cells are correlated to nodes and the adjacency relationships are correlated to edges; and computer instruction means for generating format data from the lower order format data in which the plurality of cells are correlated to nodes and the adjacency relationships common to the lower order format data are correlated to edges.

\* \* \* \* \*